United States Patent Office 3,412,983
Patented Nov. 26, 1968

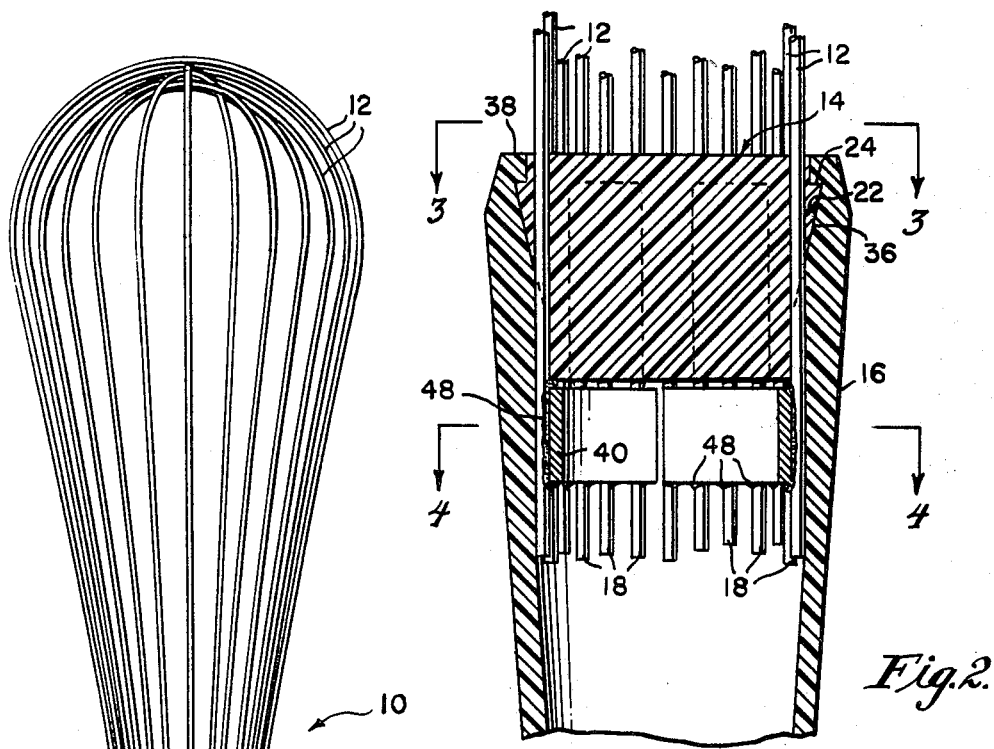
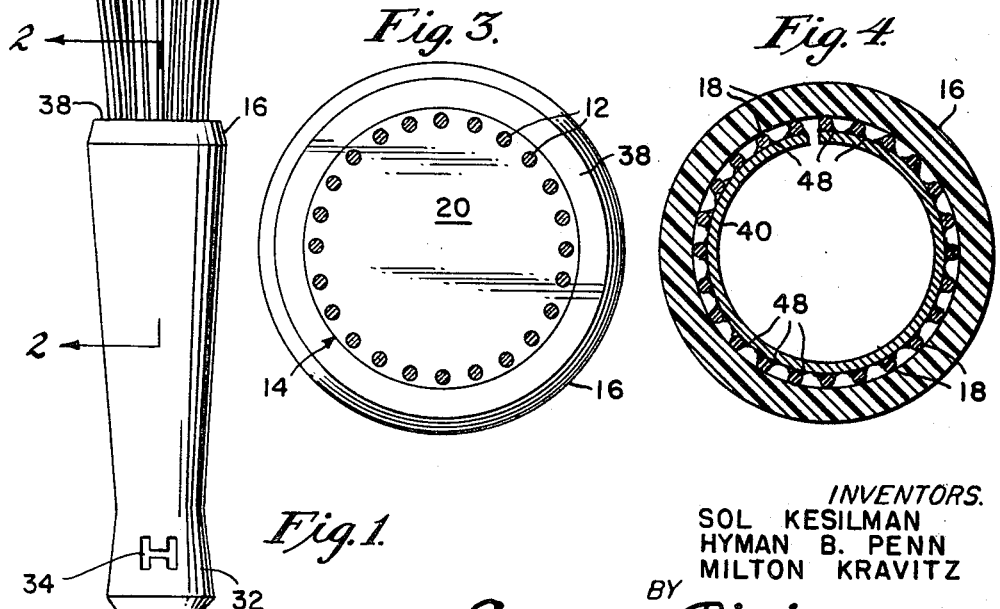

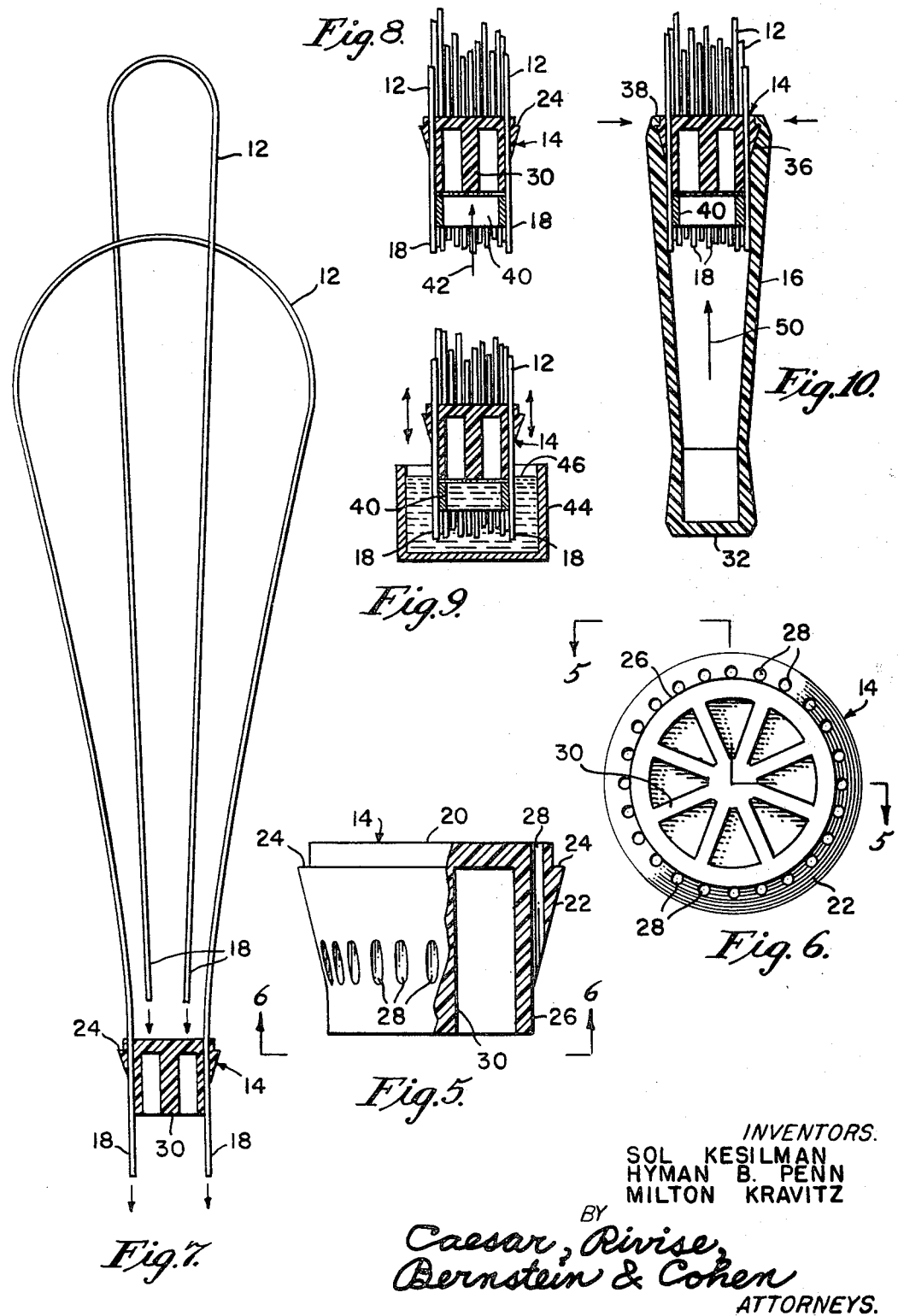

3,412,983
STIRRING WHIP AND METHOD OF
MAKING SAME
Sol Kesilman, 7930 Oak Hill Drive, Cheltenham, Pa.
19012; Hyman B. Penn, 435 Twickenham Road, Glenside, Pa. 19038; and Milton Kravitz, 7908 Rolling
Green Road, Cheltenham, Pa. 19012
Filed Feb. 10, 1967, Ser. No. 615,120
14 Claims. (Cl. 259—144)

ABSTRACT OF THE DISCLOSURE

A stirring whip including a plurality of wire loops secured in a block and a hollow handle secured to the block by a liquid-tight resilient grip. The ends of the wire loops are arranged in a spaced, parallel relationship within the block.

---

The present invention relates to a utensil known as a stirring whip, which is used for whipping such food items as pastry, eggs or potatoes.

Stirring whips are well known and generally comprise a plurality of wire loops having their ends secured in a handle. In the past, different methods have been used for securing the wire whipping portion of the whip into the handle. The most commonly used method of making this securement is the use of solder. Of course, utilizing the solder also necessitated the use of a metallic handle. In other prior art devices the ends of the wires are secured in a block. Thereafter, the block is placed in the open end of a tubular handle and is held in place by an elongated bolt and a nut secured at the opposite end of the handle.

The device of this invention includes a handle which is readily secured in place without any ancillary securement means such as solder or bolts. Furthermore, since the handle does not require additional securement means, it is possible to construct the handle out of plastic. Utilizing a plastic handle results in a savings in cost of the handle, a savings in time in attaching the handle to the whip, and increased cleanliness after continued use because the plastic handle is readily cleanable.

Another feature of the whip of this invention is that the handle is secured to the whip wires in such a way as to avoid any crevices where food or dirt can collect. Using the prior art solder securement of a metal handle always presented an area wherein dirt could collect and would be difficult to remove. Therefore, the stirring whip of this invention will be completely sanitary even with extended use.

In another aspect of this invention, there is presented a novel method of assembling a stirring whip. This method results in a great savings in time and cost over the prior art methods of assembling stirring whips.

It is therefore an object of this invention to provide a novel stirring whip.

It is another object of this invention to provide a novel method of making a stirring whip.

It is a further object of this invention to provide a stirring whip having a handle which is plastic.

These and other objects of this invention are accomplished by providing a stirring whip comprising a plurality of wire loops having ends which pass through a block, means for securing said ends to said block, a resilient handle having a hollow portion at one end, said block being engaged by said handle at said hollow end, and said handle being secured to said block by a resilient grip.

Other objects and many of the attendant advantages of this invention will be readily appreciated as the same becomes better understood by reference to the following detailed description when considered in connection with the accompanying drawings wherein:

FIG. 1 is a side elevational view of the stirring whip of this invention;

FIG. 2 is an enlarged sectional view taken along the line 2—2 of FIG. 1;

FIG. 3 is a sectional view taken along the line 3—3 of FIG. 2;

FIG. 4 is a sectional view taken along the line 4—4 of FIG. 2;

FIG. 5 is a side elevational view, partially in section, of the block of the stirring whip of this invention, and is a sectional view taken along the line 5—5 of FIG. 6;

FIG. 6 is a bottom plan view of the block of FIG. 5 and is taken in the direction of arrows 6—6 of FIG. 5;

FIG. 7 is a side elevational view, partly in section, of the first step of assembling the stirring whip of this invention;

FIG. 8 is a side sectional view of the second step of assembling the stirring whip of this invention;

FIG. 9 is a side sectional view of the third step of assembling the stirring whip of this invention; and FIG. 10 is a side sectional view of the final step in assembling the stirring whip of this invention.

Referring now in greater detail to the various figures of the drawings wherein similar reference characters refer to similar parts, a stirring whip embodying the present invention is generally shown at 10 in FIG. 1. Device 10 basically comprises a plurality of wire loops 12, with the ends of the loops passing through a block 14, and a handle 16 secured to said block.

The wire loops 12 are similar to those of the prior art stirring whips and comprise a plurality of wires looped on themselves and arranged symmetrically around the longitudinal axis of the whip. The converging ends 18 (FIG. 7) of the wires are secured in block 14.

As best seen in FIGS. 5 and 6, block 14 is circular in cross-section and includes an upper disc 20. Positioned below disc 20 is an inwardly tapering wall 22. Wall 22 terminates in a shoulder 24 adjacent disc 20. A vertical wall 26 is positioned below tapering wall 22. A plurality of equally spaced holes 28 is formed in disc 20. As seen in FIG. 5 holes 28 pass through the disc 20 and through tapering wall 22. In addition to being equally spaced, holes 28 are arranged in diametrically opposed pairs, as best seen in FIG. 6. The interior of block 14 is provided with a hub and ribbing 30 for the purpose of reinforcement and strength.

Block 14 can be formed from any resilient material. It is preferably molded from a resilient plastic such as polypropylene or polyethylene.

Handle 16 includes a long tapering shape for the purpose of ornamentation and ease of grasp. As seen in FIG. 10, handle 16 is hollow and includes a closed lower end 32. The exterior surface of the handle can be engraved with the trademark of the manufacturer, such as shown at 34 in FIG. 1. As seen in FIG. 2 the interior surface of the handle includes a taper 36 which is complementary to taper 22 of block 14. Handle 16 also includes an inwardly projecting lip 38 at its upper surface. Handle 16 includes a central opening at its upper surface with the lip 38 forming the perimeter of the opening.

The method of forming the stirring whip of this invention is seen in FIGS. 7 to 10. The first step in making the whip includes the insertion of ends 18 of a wire into diametrically opposed holes 28 (FIG. 6) of block 14. The operation is repeated until all of the holes 28 are filled, whereby the loops 12 shown in FIG. 1 will be formed. As seen in FIGS. 5 and 7, the insertion of the wires into the block 14 results in having the free ends 18 project vertically downward. This is accomplished because holes 28 pass vertically through the disc 14 and the tapering wall 22. Furthermore, since the normal tendency of the looped wire would be to force the ends 18 toward each other, the abutment of the ends against the vertical wall 26 maintains the wires in the vertical position shown.

The diameters of the holes 28 are approximately the same as the external diameters of the wires 12. Since the block 14 is made of a resilient plastic, the wires can be forced through the holes 28 and a water-tight seal will automatically be obtained. If desired, although it is not necessary, an additional seal can be effectuated by dipping the block 14 having the wires 12 secured therein into a plastic or lacquer solution. This will provide an additional seal at the lower portions of holes 28. When carrying out the dipping, therefore, it should only be done to an extent to have the resin or lacquer cover the lower portion of block 14 since this portion will not be exposed in the completed stirring whip.

After all of the wires have been inserted in the manner shown in FIG. 7, a metal ring 40 is placed within the area formed by the dependent ends 18 of the wire loops 12 (FIGS. 2 and 4). As seen in FIG. 8, this insertion is accomplished by pushing the ring upwardly in the direction of arrow 42. The diameter of the ring 40 is slightly greater than the internal diameter of the area formed by wire ends 18. Therefore, the pushing of the ring into the area of the wires results in a frictional grip on the ring by the wires, thereby holding the ring in place.

After the ring is inserted, as shown in FIG. 8, the ring is bonded to the wires by a suitable bonding agent. In one embodiment of this invention, the preferred bonding agent is solder. To accomplish the bonding, the assembly of the block 14, the loops 12, and the ring 42 is inserted into a vessel 44 containing molten solder 46. The assembly is inserted to a depth sufficient to completely cover the metal ring 40. In an alternate embodiment of this invention, ring 40 can be a plastic and vessel 44 can contain a resinous adhesive for securing the ring 40 to the wire ends 18. However, a metal ring and solder are preferred because of the added strength obtained by using these materials in combination with the metal wires 12. The wire ends 18 are bonded to the ring 40 by the solder, which is shown at 48 in FIG. 4.

With the wire ends 18 secured to the metal ring as described above, the loops 12 are permanently secured to the block 14. Thus, the removal of the loops 12 would be prevented by the abutment of the ring 40 against the lower side of block 14.

With the loops 12 secured in place, the handle 16 is then attached to the block 14. As seen in FIG. 10, this is accomplished by sliding the handle 16 upwardly in the direction of arrow 50. The tapering wall 22 on block 14 combines with the tapered wall 36 of handle 16 to provide a cam surface to facilitate the insertion of the block 14 into the handle 16. Continued insertion results in lip 38 of handle 16 being snapped into shoulder 24 of block 14, as best seen in FIG. 2. This provides a permanent, watertight connection between the handle and the block. As best seen in FIG. 3 a substantially continuous appearance will result from the tight fit between the lip 38 and the block 14. This is because the handle 16 is formed from a resilient plastic, such as polypropylene or polyethylene. In a preferred embodiment of the invention the block and the handle will be formed from the same pigmented plastics which are the same color, thereby giving an attractive appearance to the assembly.

The abutment of the wire ends 18 against the inner wall of handle 16 and the engagement between tapered walls 22 and 36 prevents the wire loops from being pushed into the handle 16 during use of the stirring whip. The engagement of loop 38 on shoulder 24 prevents the removal of the block 14 and its associated wire loops from the handle 16. It is therefore seen that the mere insertion of the block into the handle provides a permanent connection between the handle and the block. This is a marked improvement over the prior art method of forming stirring whips wherein it was necessary to secure the handle to the loops by means of solder or by means of an elongated bolt and an associated nut.

Another feature of the device of this invention is that all of the exposed surfaces of the device are smooth and there are no crevices where dirt or food could collect. Thus, as best seen in FIGS. 2 and 3, a tight seam is formed between lip 38 and disc 20 of block 14. The loops 12 present a tight fit in the top surface of the disc 20. Contrasted with this, many of the prior art devices included open soldered connections wherein food particles could collect. Other of the prior art devices had the wire loops bunched together at their base which also provides cracks for food to collect which could not easily be removed.

The wire loops can be formed from any wire material previously used in the art. A preferred material is stainless steel because of its rust resistance and the fact that it is not damaged by continued exposure to hot water for cleaning purposes.

Although this invention has been described showing the use of ring 40 in combination with solder for securing wires 12 in block 14, other methods can be used for effecting the securement. One such method is mechanically joining the wires to the ring, as by a bending and crimping method. Another method of securing the wires in place would be to eliminate the ring completely and bend each of the ends 18 outwardly and upwardly after they pass through the block 14. When doing this an annular shoulder can be placed on the interior wall of handle 16 and when the handle is pushed upwardly to the position shown in FIG. 10, the tops of the upwardly bent wire ends 18 would abut the underside of the annular shoulder, thereby preventing the removal of wire loops 12.

Another method of securing the wires in place would be to provide radial grooves in the lower wall of block 14. After the wires are passed through the block they can be bent inwardly at right angles and placed in the grooves. This prevents the wires from being pulled outwardly and the placing of the wire ends in the grooves prevents any rotational movement of the loops during use.

The wires can also be secured in the block by twisting or crimping the ends 18. Thus, when the ends 18 are forced into holes 28 there will be a frictional grip on the ends of the wire by the resilient block 14. If desired, the block can also be heated to cause the plastic of the block to flow into the crimped or twisted ends of the wires.

It is therefore seen that any means may be used for securing the wires in the block without departing from the scope of this invention.

Without further elaboration, the foregoing will so fully illustrate my invention, that others may, by applying current or future knowledge, adopt the same for use under various conditions of service.

What is claimed as the invention is:

1. A stirring whip comprising a plurality of wire loops having ends which pass through a block, means for securing said ends to said block, a resilient handle having a hollow portion at one end, said handle including a tapering wall in said hollow end and said block having an exterior tapering wall with the taper of said block being complementary with the taper of said handle, said block being engaged by said handle at said hollow end, with said tapering walls being contiguous, said handle being secured to said block by a resilient grip, and said handle including an inwardly projecting lip at its upper surface, with said lip resting on a shoulder of said block.

2. The stirring whip of claim 1 wherein said means for securing said ends comprises a ring secured to said ends.

3. The stirring whip of claim 2 wherein said ring comprises a metal and is secured to said ends by solder.

4. The stirring whip of claim 1 wherein said ends pass vertically through said clock.

5. The stirring whip of claim 1 wherein said ends are spaced in said block.

6. The stirring whip of claim 5 wherein said ends are substantially parallel in passing through said block.

7. The stirring whip of claim 1 wherein said shoulder on said block is positioned at the top of said tapering wall on said block whereby said handle is secured on said block by forcing the tapering wall of said block into the tapering wall of said handle until said lip engages said shoulder.

8. The stirring whip of claim 1 wherein said handle comprises a resilient plastic.

9. The stirring whip of claim 8 wherein said plastic comprises polypropylene.

10. The stirring whip of claim 8 wherein said block comprises a plastic.

11. A method of making a stirring whip comprising forming a plurality of wire loops by inserting opposite ends of wires into holes formed in a block, passing said opposite ends of wires through said block to have the ends of said wires exterior of said block, placing a ring in the free ends of said wires, securing said ring to said free ends of said wires, and securing a resilient handle onto said block by sliding said block into an opening formed in one end of said handle, whereby said block will be resiliently held in said handle.

12. The method of claim 11 wherein said ring comprises a metal and said free ends are secured to said metal ring by dipping the assembly of said free ends and said metal ring into liquid solder.

13. A method of making a stirring whip comprising forming a plurality of wire loops by inserting opposite ends of wires into holes formed in a block, securing said opposite ends in said block, securing a resilient handle onto said block by sliding said block into an opening formed in one end of said handle, said handle including an inwardly projecting lip at said open end, and said block being inserted into said open end until said lip engages a shoulder on said block, whereby said block will be resiliently held in said handle.

14. A stirring whip comprising a plurality of wire loops secured in a plastic block, said plastic block having a top side and a bottom side, side wire loops having end which enter the top side of said block and pass through the bottom side, a metal ring secured to said ends by solder, a resilient handle having a hollow portion at one end, and said block being engaged by and secured to said handle at said hollow end.

References Cited

UNITED STATES PATENTS

| | | | |
|---|---|---|---|
| 567,684 | 9/1896 | Moody | 259—144 |
| 871,247 | 11/1907 | Tomlinson | 259—144 |
| 1,004,786 | 10/1911 | Hess | 259—144 |
| 2,499,074 | 2/1950 | Nordgarden | 259—144 |
| 2,949,284 | 8/1960 | Egedal | 259—144 |

FOREIGN PATENTS

| | | |
|---|---|---|
| 266,884 | 10/1913 | Germany. |
| 549,084 | 4/1932 | Germany. |
| 137,509 | 10/1952 | Sweden. |
| 111,116 | 8/1925 | Switzerland. |

WILLIAM I. PRICE, *Primary Examiner.*